(No Model.) 2 Sheets—Sheet 2.
J. CHARLTON.
MOTOR OR TREADLE POWER.
No. 474,054. Patented May 3, 1892.
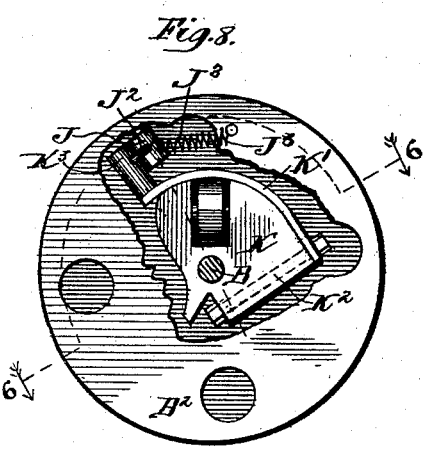
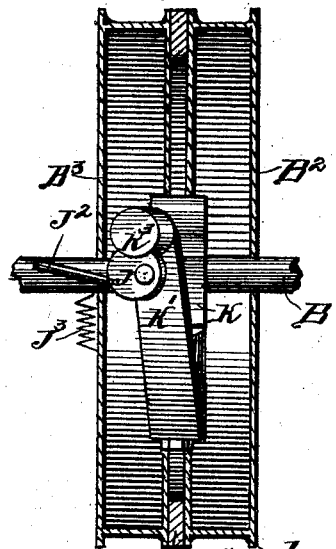
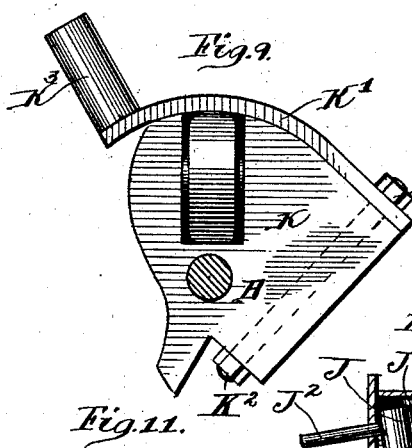
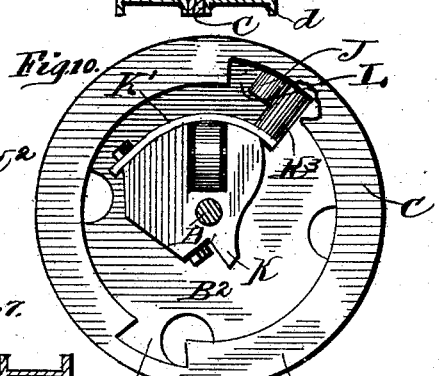
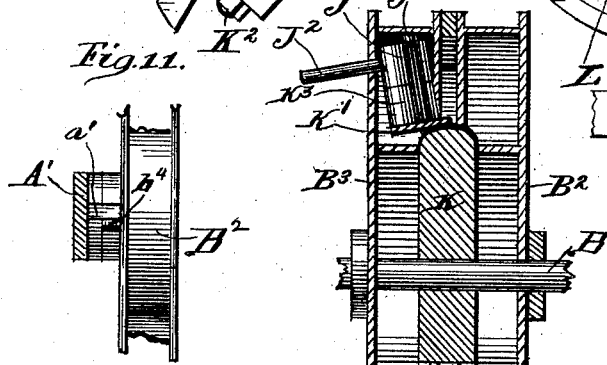
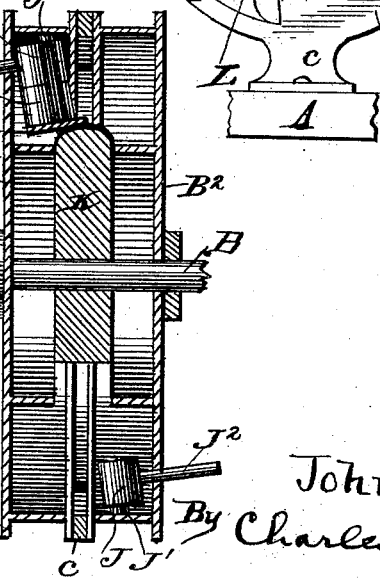
Witnesses:
Lute S. Alter,
Tessa G. Parrish
Inventor:
John Charlton,
By Charles T. Brown
Atty

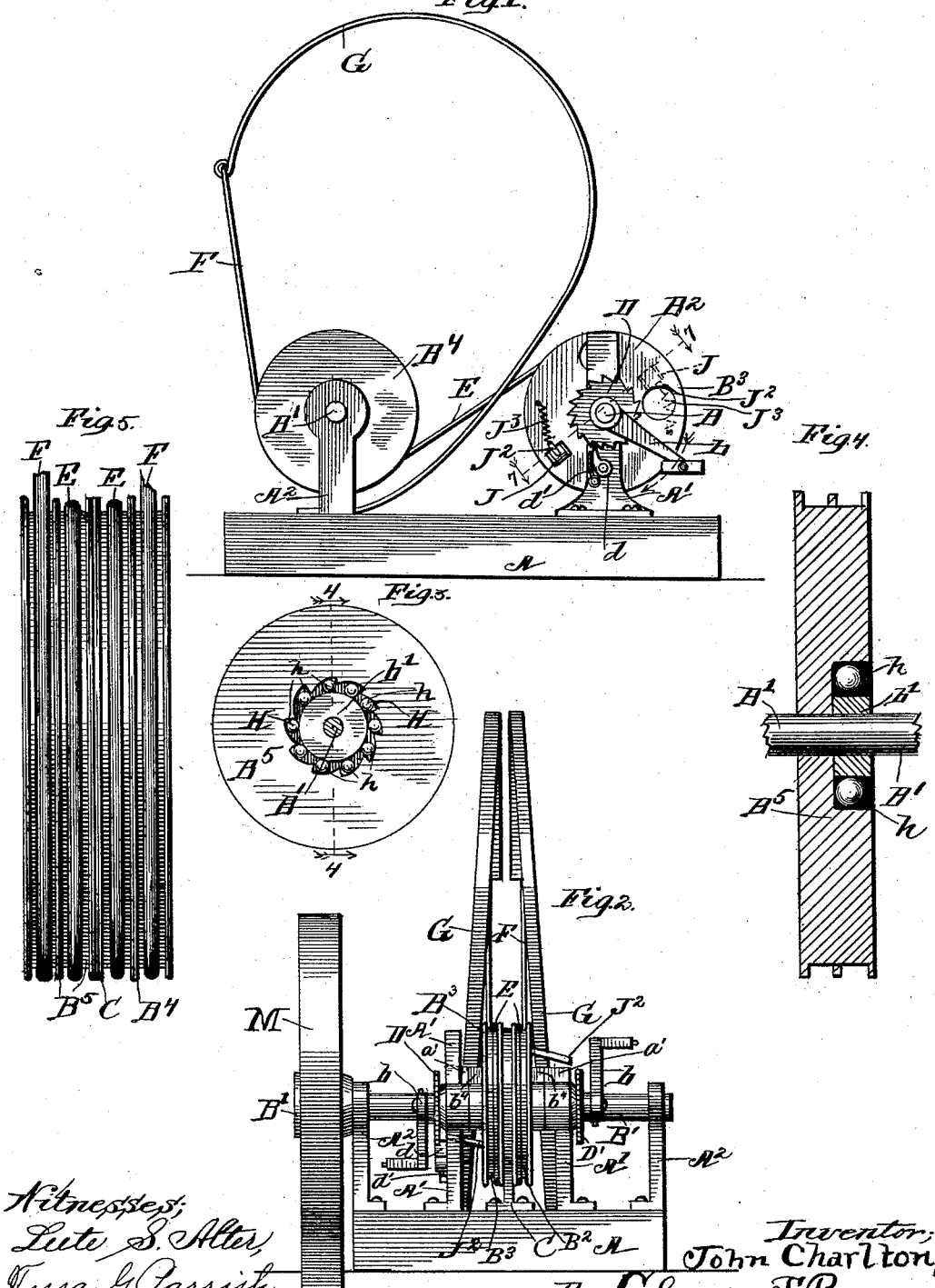

UNITED STATES PATENT OFFICE.

JOHN CHARLTON, OF CHICAGO, ILLINOIS.

MOTOR OR TREADLE-POWER.

SPECIFICATION forming part of Letters Patent No. 474,054, dated May 3, 1892.

Application filed June 29, 1891. Serial No. 397,803. (No model.)

*To all whom it may concern:*

Be it known that I, JOHN CHARLTON, a resident of the city of Chicago, in the county of Cook and State of Illinois, have invented certain new and useful Improvements in Motors or Treadle-Powers, of which the following is a specification.

My invention relates to that class of motors or treadle-power devices wherein motion is obtained by the rotation of a crank or treadle secured to a shaft, and such motion is transmitted from the crank or treadle shaft, either directly or through intervening shafts, to the machinery or devices actuated by the motor or treadle-power; and my invention is designed for and specially adapted to be used in combination with or for the purpose of actuating machines and devices requiring a small amount of power to run them as compared with the force easily exerted by the arms or legs of a person upon a crank or treadle, and, too, machines wherein greater speed in the rotation of the driven shaft thereof is desirable than is obtainable in the speed of a treadle or crank without undue exertion and loss of energy or force.

The object of my invention is to obtain a motor or treadle-power by which a person may exert in the movement of the treadles or cranks thereof that amount of force which can be the most economically expended—that is, with the least effort—by such person and at the rate of speed which is the best suited to the expenditure of such force by such person, and thereby to secure a motor or treadle-power by which when a machine or device which requires but little power to actuate it is being driven thereby a greater speed will be possible in such machine or device than could be continuously attained if the treadle or crank of the motor or treadle-power were required to move synchronously with the shaft of the machine or device which is driven by the motor or treadle-power.

A further object of my invention is to obtain a motor or treadle-power which can be as easily operated and at the the same rate of speed at one time as at any other time, although the power or force required to run the machine or device actuated by the motor or treadle-power is variable from any reason, as by the kind of work being done on a sewing-machine or the character of the roadway or its grade over which a bicycle is being driven by the motor or treadle-power, the only resulting difference being in the variation of speed of the driven machine or device.

My invention is embodied in a machine which consists, briefly, of a rotatable treadle or crank shaft having treadle or crank arms secured thereon, wheels loosely mounted upon such shaft adapted to have an alternating forward and backward partial rotation on the crank-shaft, a connection between the crank-shaft and such wheels, whereby continuous forward movement of the crank-shaft produces the desired intermittent forward movement of such wheels, a second shaft, a wheel mounted thereon in such manner as to be adapted to turn or be turned in either direction, and when turned in one direction rotation in the shaft on which it is mounted is thereby produced, but when such wheel turns or is turned in the other direction the shaft thereof is not rotated thereby, connecting cords or cables attached to and extending from one of such pair of wheels to the other thereof, and springs connected to the second-named wheels by cords or cables in such manner that when such wheels are rotated in one direction the spring is thereby wound or partially wound and when such wheel is released from turning the spring is permitted to unwind and thereby to rotate such wheel and the shaft on which it is mounted, such shaft constituting the shaft off which motion is obtained, and being hereinafter termed the "driving-shaft" of the motor or treadle-power.

I have illustrated my invention by the drawings accompanying and forming a part hereof, in which—

Figure 1 is a side elevation of the motor or treadle-power with the wheel thereof, by which motion can be transmitted to the machine or device driven thereby, removed; Fig. 2, an end elevation of the motor or treadle-power, with the treadle end of the device toward the observer; Fig. 3, an elevation of one of the wheels forming a part of the device mounted on the shaft from which power is taken from such device and showing the manner in which such wheel is mounted; Fig. 4, a cross-section of such wheel on line 4 4 of Fig. 3, viewed in the direction of the arrows; Fig. 5, a front elevation of the wheel illustrated in Fig. 3, on an enlarged scale; Fig. 6, a cross-section on lines 6 6 of Fig. 8, viewed in the direction of the arrows; Fig. 7, a cross-section on line 7 7 of Fig. 1, also viewed in the direction of the arrows; Fig. 8, a side elevation of such wheel, with a portion of the outer side or shell thereof broken away to expose to view the several devices inclosed therein, (but not attached thereto,) which are secured on the shaft thereof, such shaft being the crank-shaft of the motor or treadle-power; Fig. 9, an elevation of such devices rigidly attached to the crank-shaft of the motor or treadle-power; Fig. 10, an elevation of an immovable partition between the wheels illustrated in Fig. 6, with one of such wheels removed; and Fig. 11, a top plan view of one of the supports and bearings of the crank-shaft and of a portion of one of the wheels mounted thereon, showing a stop obtained by a projecting lug on the journal, which is adapted to contact with a lug on the hub of the wheel.

Like letters refer to like parts throughout the several views thereof.

A is the base of the motor or treadle-power.

A' A' and A² A² are standards secured to base A.

$a'$ $a'$ are stops on the standards A' A', respectively.

$b$ is the pedal or crank-arm secured to crank-shaft B. Crank-shaft B is rotatably held and supported in journals A'.

B' is a shaft rotatably supported in standards A² A², and $b'$ a hub or small disk rigidly secured to shaft B'.

B² B³ are wheels loosely mounted on crank-shaft B.

$b^2$ $b^3$ are the ends of wheels B² B³, respectively.

B⁴ B⁵ are wheels loosely mounted on shaft B'.

$b^4$ is a stop on wheels B² B³, adapted to contact with stop $a'$ on standard A'.

C is a non-revoluble standard secured to base A and extending between wheels B² B³, around but not touching shaft B.

D D' are ratchet-wheels rigidly mounted on shaft B.

$d$ is a dog adapted to engage with the teeth on ratchet-wheel D, and $d'$ is a spring tending to hold it in such engagement.

E E are cords or cables extending partially around wheels B² B³, respectively, and from thence to and partially around wheels B⁴ B⁵.

F F are cords or cables extending partially around the wheels B⁴ and B⁵, respectively, in the opposite direction from the direction in which cords or cables E E extend on such wheels and from such wheels B⁴ and B⁵ to spring G, being secured to such spring. Cords or cables E E F F are secured to the wheels B⁴ and B⁵, and such wheels B⁴ and B⁵ are mounted on the shaft B', so as to be adapted to make a partial rotation in one direction and then in the other.

H H, Fig. 3, are internal ratchet-teeth on wheels B⁴ and B⁵, respectively, and $h$ $h$ are balls placed between teeth H H and the hub $b'$, forming a clutch, whereby wheels B⁴ and B⁵, when rotated in one direction by the cord or cables F F, cause rotation of hub $b'$ and shaft B', to which such hub is secured, while when such wheels B⁴ and B⁵ are respectively rotated in the other direction they turn freely on the hub $b'$.

Within the wheels B² B³, such wheels being hollow and loosely mounted on crank-shaft B, there is rigidly secured to the crank-shaft B a device, illustrated in Figs. 6 to 10, both inclusive, by means of which, as the crank-shaft is rotated in the direction illustrated by the arrow on the pedal in Fig. 1, one of such wheels shall be rotated therewith nearly one-half around, at which time the device is tripped and such wheel allowed to assume its original position, while by the tripping of such device the other of the wheels B² B³ is in turn rotated nearly if not quite one-half around such crank-shaft. The tripping device referred to consists of cam J, pivoted on pin or shaft J' to the shell or case of the wheels B² B³, respectively.

J² is an arm extending out from cam J through the shell of the wheels B² B³, respectively, and into position to be brought in contact with the standards A' A', and J³ is a spring yieldingly holding the cam J in position, so that the device rigidly secured to the shaft B and about to be described shall engage with such cam J and thereby pivotally rotate the wheels B² B³, respectively. This device, referred to as secured to the shaft B, consists of the hub K, rigidly secured to shaft B, arm or lever K', pivotally secured on pivot K² to hub K, and roller K³, pivoted on the end of the arm K', and is hereinafter termed the "crank-shaft clutch."

L L are openings through non-revoluble standard or partition C, formed by cutting away a portion thereof.

M is a balance or driving wheel on shaft B'.

The operation of the device is as follows: When the crank-shaft B is turned in the direction in which the hands of a clock turn, the crank-shaft clutch rotates with such crank-shaft. The roller K³ on such device being necessarily behind or back of the cam J on one or the other of the wheels B² B³, such wheel is moved forward with the crank-shaft until the arm J² of the cam J is brought against the standard A', when the immovable partition C, being properly adjusted in reference to the openings L L and the stops formed by cam J, arm J², and standard A', the roller K³ is thrown off the cam J and through one of such openings L to the other side of the movable partition C and behind the cam-roller J on the other side of the wheels B² B³, such other wheel being thereby carried around with the crank-shaft. The wheel on which the cam J has been operated, as last described, can then return to its initial position and is so returned, as will be seen. As such wheels B² or B³ turn backward in obtaining, severally, their initial positions they are stopped by the projections $b^4 b^4$ thereon respectively coming in contact with the projections $a' a'$ on the standards $A' A'$, respectively. When wheels $B^2 B^3$ are forced forward by the crank-shaft clutch, the cords or cables E E on such wheels, respectively, are drawn forward and wheels $B^4 B^5$ thereby turned in the opposite direction, by such turning drawing the free ends of the springs G G down toward these wheels, respectively, by the cords F F, one end of such cords being secured, as hereinbefore stated, to wheels $B^4 B^5$, respectively, and the other end to the spring G, and when the wheels $B^2 B^3$, respectively, are tripped from the crank-shaft clutch in the way stated the spring G resumes its initial position, thereby carrying the wheels $B^4 B^5$, cord E, and wheels $B^2 B^3$ back into their initial position, respectively. The wheels $B^4 B^5$, as they turn to the right— that is, in the direction the hands of a clock turn—cause the shaft B' to turn with them through the ratchet made by the teeth H and balls $h$, Fig. 3, and the driving-shaft B' of the device is thus turned. When the machine driven by this motor or treadle-power is adapted to have the shaft B' secured to or made a part of the main driving-shaft of the machine—as, for instance, upon a bicycle or sewing-machine—I deem it preferable to so attach the shaft, and in such case the wheel M would, if used at all, serve merely as a balance-wheel for the motor or treadle-power.

It is evident that the strength of the springs G G should be commensurate with the character of the work to be done by the machine or device driven thereby, and that such springs may be of different shape or form of construction from those illustrated in the drawings, the essential function of the springs required by me being the tendency to draw upon cord F, and thereby return it to its initial position after such cord has been partially wound around the wheels $B^4 B^5$ by the wheels $B^2 B^3$ and connecting-cords E E. It is also evident that in case the machine or device actuated by the motor or treadle-power is hard to start the springs G G may both be drawn taut by the rotation of the crank-shaft before such machine or device will be started— as, for instance, when the strength of both springs is required—after which the springs will unwind a proportionate amount to the force required to maintain the machine or device in continuous motion.

The partition C is used to prevent the roller $K^3$ from passing out from behind the cam J on one of the wheels $B^2 B^3$ to a position behind the other one of such rollers, except at the proper time, such time being when such roller $K^3$ is tripped by the arm $J^2$ coming in contact with the standard A', at which time the roller $K^3$ is opposite the opening L in standard C, and hence where the roller $K^3$ is held firmly enough in position by cam J the partition C may be dispensed with, although I prefer to use it at all times.

Having thus described my invention, what I claim, and desire to secure by Letters Patent of the United States, is—

1. The combination of a rotatable shaft mounted in supports, treadle-arms secured thereon, wheels loosely mounted upon the treadle-shaft, adapted to alternately move forward and backward, a connection between the crank-shaft and such wheels, whereby continuous movement of the crank-shaft produces alternate forward movement of such wheels, a second shaft rotatably mounted in standards, wheels mounted thereon and connected by a ratchet thereto, so as to be rotatable in one direction without rotating the shaft thereof and rotatable in the other direction synchronously with the shaft, connecting-cords extending partially around one of the wheels upon one of the shafts and one of the wheels upon the other of the shafts, and springs, one end thereof being secured to an abutment and the other end having a cord attached thereto, extending therefrom to and partially around the wheels on the second-named shaft of the motor, substantially as described.

2. The combination of a rotatable shaft mounted in supports, treadle-arms secured thereon, wheels loosely mounted upon the treadle-shaft, adapted to alternately move forward and backward, a connection between the crank-shaft and such wheels, whereby continuous movement of the crank-shaft produces alternate forward movement of such wheels, a second shaft rotatably mounted in standards, wheels mounted thereon and connected by a ratchet thereto, so as to be rotatable in one direction without rotating the shaft thereof and rotatable in the other direction synchronously with the shaft, and a non-rotatable ring standard having openings therein, through which the connection between the crank-shaft and such wheels can pass, connecting-cords extending partially around one of the wheels upon one of the shafts and one of the wheels upon the other of the shafts, and a spring, one end thereof being secured to an abutment and the other end having a cord attached thereto, extending therefrom to and partially around the wheels on the second-named shaft of the motor, substantially as described.

JOHN CHARLTON.

Witnesses:
CHARLES T. BROWN,
TESSA G. PARRISH.